United States Patent [19]

Collett et al.

[11] 4,431,394
[45] Feb. 14, 1984

[54] MARSHMALLOW MOLD

[76] Inventors: Lee W. Collett; Janet Collett, both of 23608 NE. 10th Ave., Ridgefield, Wash. 98642

[21] Appl. No.: 280,867

[22] Filed: Jul. 6, 1981

[51] Int. Cl.³ .......................... B29C 1/00; A23G 3/12
[52] U.S. Cl. ..................................... 425/177; 249/175
[58] Field of Search .............. 425/177, 175, 318, 469; 99/431, 432, 428, 439, 104, 279, 383, 442, 512, 514; 164/187; 30/305, 314–316; 249/175, 177

[56] References Cited

U.S. PATENT DOCUMENTS

| | | | |
|---|---|---|---|
| 144,939 | 11/1873 | Wingate | 99/439 |
| D. 253,025 | 10/1979 | Lewis | D7/44 |
| 522,797 | 7/1894 | Metcalf | 99/431 |
| 858,460 | 7/1907 | Knapp | 249/175 |
| 866,179 | 9/1907 | Andresen | 249/175 |
| 1,369,381 | 2/1921 | Bondi | 425/318 |
| 1,480,151 | 1/1924 | Cosman | 30/416 |
| 1,781,411 | 11/1930 | Reiber | 99/431 |
| 1,823,956 | 9/1931 | Schroeder | 249/175 |
| 2,052,510 | 8/1936 | Woolvertan | 107/1 |
| 2,515,952 | 7/1950 | Doyle | 425/469 |
| 2,554,734 | 5/1951 | Gehm | 425/469 |
| 2,586,823 | 2/1953 | Huhn | 30/305 |
| 2,909,805 | 10/1959 | James | 18/51 |
| 2,917,782 | 12/1959 | Goldwag | 18/55.05 |
| 3,061,880 | 11/1962 | Weisbach | 18/34 |
| 3,155,055 | 11/1964 | Nishkian | 107/15 |
| 3,867,078 | 2/1975 | Porter | 425/177 |
| 3,921,801 | 11/1975 | Sway | 206/223 |
| 4,338,272 | 7/1982 | Pelton et al. | 264/225 |

*Primary Examiner*—Willard E. Hoag
*Attorney, Agent, or Firm*—Glen A. Collett

[57] ABSTRACT

A mold for use in making decorative marshmallows. A mold body forms a positive male punch mold having an exterior bottom surface of decorative shape. A handle is attached to the body and is upstanding therefrom. The mold is pressed into flour to form impressions in the flour. The impressions are then filled with a marshmallow mixture which sets up forming decorative marshmallows having the shape of the original positive mold.

16 Claims, 12 Drawing Figures

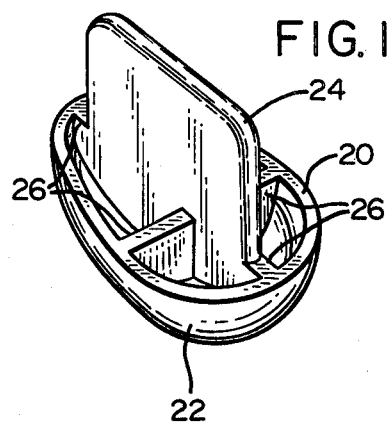
FIG. 1
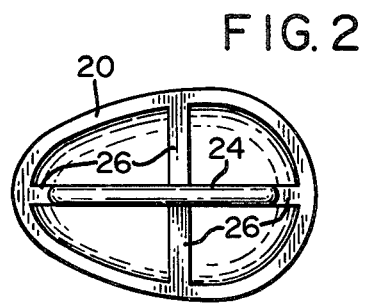
FIG. 2
FIG. 3
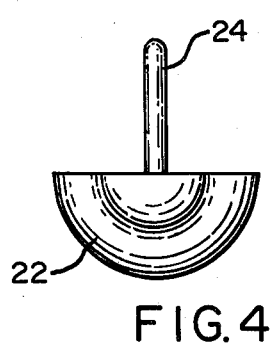
FIG. 4
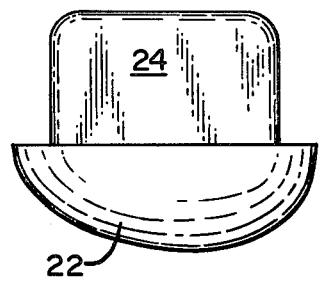
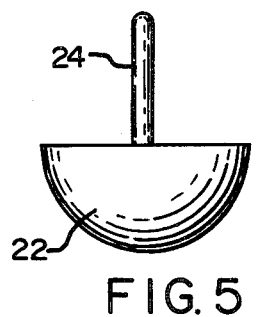
FIG. 5
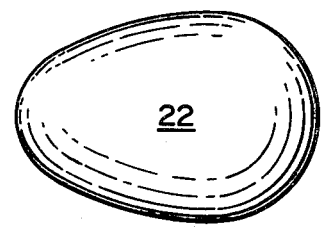
FIG. 6
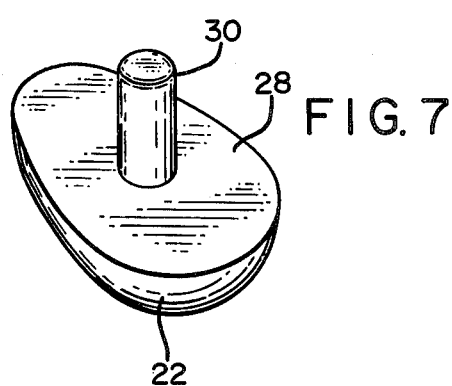
FIG. 7

MARSHMALLOW MOLD

BACKGROUND OF THE INVENTION

The present invention relates to molds, and in particular to a positive male punch mold for making flour impressions for the subsequent molding of decorative marshmallows.

In the past most marshmallows have been made commercially and are all of a single configuration. However, recipes for making marshmallows at home can be found in the literature. They generally specify that the marshmallow mixture be dumped onto a flour-coated flat pan or the like, and then cut into small squares after the marshmallow mixture sets up.

It has also been the practice to make impressions in a pan of flour with the use of a natural object, such as an egg. The impressions are then filled with a marshmallow mixture. When the mixture is set up, the marshmallows are lifted out of the flour. The marshmallows produced are the positive image of the natural object impressed in the flour, e.g. an egg.

The shapes of such marshmallows are thus restricted to the shapes of such natural objects as can be found, and have the appropriate size and smoothness for making flour impressions.

Also, such a natural object, e.g. an egg, must be pressed about halfway into the flour. Thereafter it is difficult to remove the object without damage to the flour impression.

SUMMARY OF THE INVENTION

Accordingly, it is the general object of the present invention to provide a positive mold for forming flour impressions for making decorative marshmallows.

Another object is to provide a number of variously shaped molds, each having the appropriate shape, size and smoothness for forming flour impressions.

Another object is to provide a mold having good flour-release characteristics.

A further object is to provide a handle on the mold for easy removal from the flour.

A still further object is to provide a mold which is simple in construction and which may be inexpensively and readily manufactured.

In its basic concept, the present invention is a mold for use in making decorative marshmallows. It includes a mold body or shell forming a positive male punch mold with a bottom surface of decorative shape, and a handle attached to the top of the body or shell and upstanding therefrom.

BRIEF DESCRIPTION OF THE DRAWINGS

FIG. 1 is a top perspective view of an egg-shaped mold of the present invention.

FIG. 2 is a top plan of the mold of FIG. 1.

FIG. 3 is a side elevation of the mold of FIG. 1.

FIG. 4 is an end elevation of the mold of FIG. 1.

FIG. 5 is the other end elevation of the mold of FIG. 1.

FIG. 6 is a bottom view of the mold of FIG. 1.

FIG. 7 is a top perspective view similar to FIG. 1 illustrating a second embodiment of the present invention.

DESCRIPTION OF THE PREFERRED EMBODIMENTS

Figure 8:
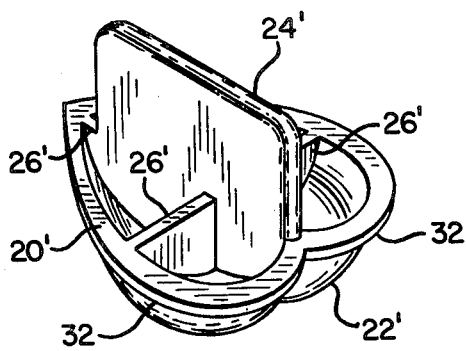
FIG. 8 is a top perspective view of a heart shaped mold according to the present invention.

As shown in FIGS. 1-6 the present invention is a mold for forming flour impressions for making decorative marshmallows.

A shell 20 defines the general form of the mold which is, in this embodiment, that of half an egg. The shell has an exterior bottom surface 22 which is substantially smooth.

The top or upper extent of the shell is defined by an imaginary plane which is substantially horizontal. Thus, the top of the shell is smoothly truncated. The shell is substantially convex below this horizontal plane.

The bottom surface 22 has a draft angle of at least one degree, and preferably at about 10 degrees from vertical. No undercuts, or horizontal indentations extending into the surface deeper than the surface area below the indentations, are allowed in the bottom surface. This is to insure that the mold forms a smooth impression in the flour, and can be retracted without damaging the impression.

A handle means, such as a substantially flat tab 24 is attached to and is upstanding from the top of shell 20. The handle provides an easy finger grip for manipulating the mold.

A web 26 or a plurality of such webs span the interior of the shell to provide rigidity. Tab 24 is simply an upstanding portion of one of the webs, forming the handle.

FIG. 7 illustrates a second embodiment of an egg-shaped mold. In this embodiment a solid mold body 28 is provided. The body forms a positive male punch mold with a decorative external bottom surface 22, similar to that of the first embodiment. The handle in this embodiment is a projection 30 extending upwardly from the horizontal top surface of the body.

Figure 9:
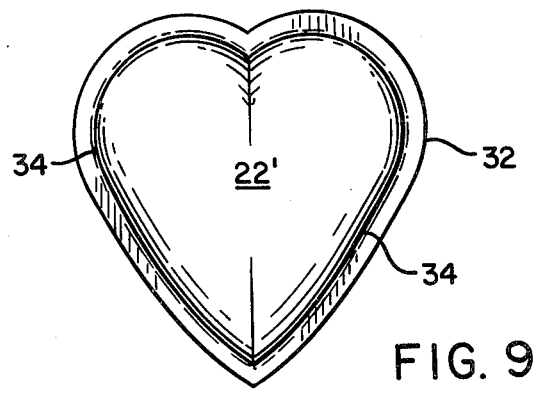
FIG. 9 is a bottom view of the mold of FIG. 8.

FIGS. 8 and 9 illustrate a stylized heart shaped mold of the present invention. Additional to the structure shown in FIG. 1, a lip 32 is illustrated extending outwardly around the top edge of the shell. This lip serves to pack the flour down around the top of the impression, and thus preserve the shape of the impression after the mold is withdrawn. Preferably, the angle between the bottom surface of the shell and the underside surface of the lip is rounded with a fillet 34.

Figure 10:
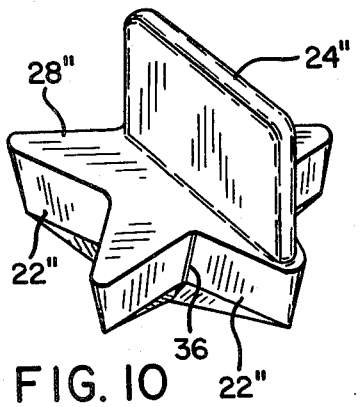
FIG. 10 is a top perspective view of a star shaped mold according to the present invention.
Figure 12:
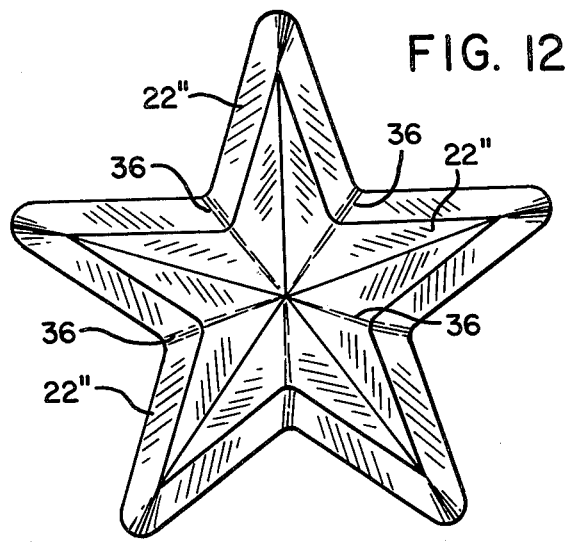
FIG. 12 is a bottom view of the mold of FIG. 10.
Figure 11:
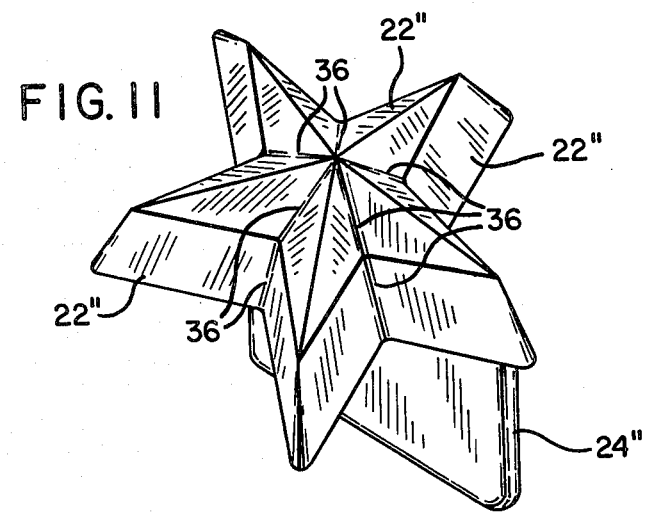
FIG. 11 is a top perspective view of the bottom surface of the mold of FIG. 10.

FIGS. 10-12 illustrate a stylized star shaped mold according to the present invention. In this embodiment it can be readily seen that both interior and exterior angles may be formed on the bottom exterior surface of the mold. Interior angles are preferably rounded with fillets 36 to readily release the flour when withdrawing the mold.

The mold is most readily manufactured of plastic, and it will be appreciated that the shell-type embodiment of the invention is most suited for this manufacture. Mold release agents may be added to the plastic to make the mold slicker or reduce static attraction of flour to the mold.

It is apparent that many other shapes and styles of decorative marshmallows can be made using marshmallow molds of the present invention. The configuration shown and discussed are only examples of various features of the molds, and no limitation is intended thereby.

OPERATION

The marshmallow mold of the present invention is very simple and straightforward to use. A pan with powdered material such as flour or cornstarch about one inch deep is prepared. The top of the flour is packed down lightly and smoothed. Then the mold is pressed into the flour to form an impression. Many impressions of various shapes may be made. A simple marshmallow mixture is prepared and spooned into the impressions. When the mixture sets up, the decorative marshmallows thus produced are ready to eat. The flour lightly dusts the exterior of the marshmallow.

Having described our invention in its preferred embodiments, we claim:

1. Apparatus for use in making decorative marshmallows, comprising:
    (a) powdered material prepared by packing it to a suitable depth in a pan;
    (b) a body forming a positive male punch mold having an exterior bottom surface of decorative shape and operable to press into the powdered material to form a substantially smooth impression therein;
    (c) handle means attached to and upstanding from the body; and
    (d) a lip extending outwardly around the upper edge of the body for packing the powdered material around the edge of the formed impression, the lip extending to a distance spaced apart from the edge of the pan.

2. The apparatus of claim 1 wherein the handle means comprises a finger-grip handle for manipulating the mold, said handle being merely an upstanding elongated substantially flat tab extending above the mold body and transversely substantially across the mold body.

3. The apparatus of claim 1 wherein the angle between the bottom surface of the body and underside surface of the lip is rounded.

4. The apparatus of claim 1 wherein the body comprises a shell of substantially uniform thickness.

5. The apparatus of claim 4 further comprising a web spanning the interior of the shell to provide rigidity.

6. The apparatus of claim 5 wherein the handle means comprises a tab which is formed as an upstanding portion of the web.

7. For use in making decorative marshmallows, a positive mold for forming a negative impression in powdered material for the subsequent molding of a positively shaped marshmallow from a marshmallow mixture placed in the impression in the powdered material, the mold comprising:
    (a) a body forming a positive male punch mold and having an exterior bottom surface of decorative shape and operable to press into the powdered material to form a substantially smooth impression therein; and
    (b) a finger-grip handle for manipulating the mold, said handle being merely an upstanding elongated substantially flat tab, extending above the mold body and transversely substantially across the mold body.

8. The mold of claim 7 wherein the exterior bottom surface of the mold is substantially smooth.

9. The mold of claim 7 wherein the bottom surface of the body is truncated by a substantially horizontal plane defining the upper extent of the body, and wherein the bottom surface is substantially convex below the horizontal plane.

10. The mold of claim 7 wherein the bottom surface has a draft angle of at least one degree, and wherein the surface is free of undercuts.

11. The mold of claim 7 wherein the bottom surface has both interior and exterior angles, and wherein the interior angles are rounded.

12. The mold of claim 7 wherein the body further comprises a lip extending outwardly around the upper edge of the bottom surface.

13. The mold of claim 12 wherein the angle between the bottom surface and the underside surface of the lip is rounded.

14. The mold of claim 7 wherein the body comprises a shell of substantially uniform thickness.

15. The mold of claim 14 further comprising a web spanning the interior of the shell to provide rigidity.

16. The mold of claim 15 wherein the tab comprises an upstanding portion of the web, being relatively thin, but extended in the plane of the web.

* * * * *